C. F. STODDARD.
EXPRESSION MECHANISM FOR MUSICAL INSTRUMENTS.
APPLICATION FILED FEB. 5, 1917.
1,409,493.
Patented Mar. 14, 1922.
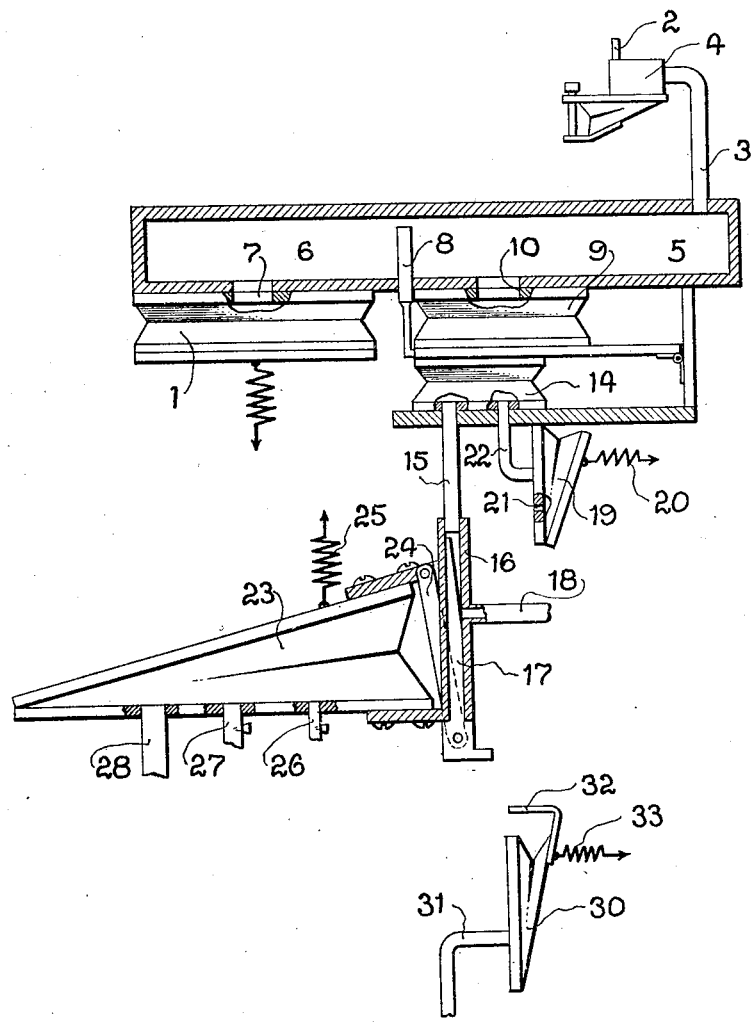

UNITED STATES PATENT OFFICE.

CHARLES F. STODDARD, OF NEW YORK, N. Y., ASSIGNOR TO AMERICAN PIANO COMPANY, OF NEW YORK, N. Y., A CORPORATION OF NEW JERSEY.

EXPRESSION MECHANISM FOR MUSICAL INSTRUMENTS.

1,409,493. Specification of Letters Patent. Patented Mar. 14, 1922.

Application filed February 5, 1917. Serial No. 146,673.

*To all whom it may concern:*

Be it known that I, CHARLES F. STODDARD, a citizen of the United States, residing in the city of New York, county and State of New York, have invented an Improvement in Expression Mechanism for Musical Instruments, of which the following is a specification.

This invention relates to apparatus for automatically varying playing intensities in automatic musical instruments, such, for instance, as player-pianos and the like.

Among other objects, the invention is intended to provide apparatus capable of producing prompt changes in playing intensity while maintaining intensities so far as may be desired, regardless of the number of tones sounded.

The character of the invention may be readily understood by reference to the accompanying drawings which show diagrammatically one illustrative embodiment thereof.

In the drawings, a bellows 1 exemplifies a main source of power for operating the playing pneumatics which may be operated selectively, as well understood by those skilled in the art, from a tracker board through ducts 2. A duct 3 connects the action chests 4 of the player pneumatics with a wind chest 5. A wind chest 6 communicates with the main source of power through an unobstructed port 7 and communication between the wind chest 6, which may be termed the high exhaust chest, and wind chest 5, which may be termed the regulated exhaust chest, is controlled by a valve 8. As well understood in the art, the regulator valve 8 regulates the flow of air from the action chest 4 to the source 1.

Means are herein provided to control the regulator valve to secure variations in regulation and in playing intensities by way of crescendos and diminuendos and by substantially distinct steps. A regulator pneumatic 9 is in free communication with wind chest 5 through a port 10 and pneumatic means are provided for variably tensioning the regulator pneumatic 9 as will be presently described. The movable board of the regulator bellows 9 is connected to the regulator valve 8 by a rod 11. It will therefore be apparent that any movement of the regulator pneumatic will be communicated to the valve 8.

The degree of exhaust in the regulated wind chest 5 will depend upon the tension exerted upon the regulator pneumatic in opposition to the pull of the exhaust within the regulated exhaust chest. The variable pneumatic tension device includes a bellows 14 having its movable board fast to the movable board of the regulator pneumatic and adapted to be variably exhausted. A duct 15 connects the interior of the pneumatic 14 with a valve casing 16 having a throttle valve 17 controlling the opening of a duct 18 into the valve casing. The duct 18 is connected to any suitable source of exhaust. To equalize the momentary variations in the volume of pneumatic 14 as it is expanded or collapsed under the action of the regulator, an equalizing bellows 19 held in expanded position by a spring 20, and having a bleed 21 to atmosphere, is placed in communication with the pneumatic 14 through a duct 22. With the parts in the position shown in the drawings, the throttle valve 17 so controls the opening of the duct 18 to the interior of the valve casing, which opening may be termed the exhaust bleed, relatively to the atmospheric bleed 21, that a slight degree of exhaust is maintained in bellows 14 sufficient to exert a pull upon the regulator pneumatic of appropriate strength to determine the minimum playing intensity. It will be readily understood that as the degree of exhaust within the pneumatic 14 is increased the tension upon the regulator will be increased with a consequent increase in playing intensities.

To vary the degree of exhaust within the pneumatic 14 and the consequent tension upon the regulator, the needle valve is arranged to be operated by an expression bellows 23 having its movable board connected to the throttle valve 17 by a link 24 and held in normal expanded position by a spring 25.

The expression bellows 23 may be exhausted through a duct 26 preferably having an adjustable bleed by which the capacity of the duct may be diminished so as to cause the pneumatic 23 to collapse slowly and thereby slowly and gradually enlarge the exhaust bleed through the throttle valve. The effect of this, as will be readily understood by those skilled in the art, is to increase the tension upon the regulator and thereby modify the regulation so as to produce a gradual slow crescendo. When atmosphere is admitted through the duct 26, the bellows 23 having been wholly or partially collapsed, is then permitted to expand under the action of the spring 25. Thus the exhaust bleed is slowly restored to its normal capacity thereby permitting a decrease in the degree of exhaust within the pneumatic 14 and a consequent decrease in playing intensities by way of a slow diminuendo.

The expression bellows 23 may also be exhausted through a duct 27 of greater capacity than the duct 26 to collapse the bellows 23 at a greater speed, but preferably the duct 27 is of such restricted capacity as to collapse the pneumatic to give a crescendo effect similar to but faster than that produced by exhausting through the duct 26. When atmosphere is readmitted through the duct 27 a fast diminuendo results. To provide for incremental or substantially distinct step changes in playing intensities, the expression bellows 23 may be exhausted through a duct 28 of greater capacity than the duct 27 to collapse the bellows 23 almost instantaneously. Such a collapse of the bellows 23 suddenly enlarges the exhaust bleed to its maximum capacity and thereby suddenly increases the tension on the regulator to increase playing intensities to the full capacity of the instrument. When atmosphere is re-admitted through the duct 27 the minimum playing intensity will be quickly restored.

To provide for a plurality of distinct steps, means may be arranged to arrest the collapse of the expression pneumatic 23 intermediate its fully expanded and fully collapsed positions. A pneumatic 30, arranged to be exhausted through a duct 31, is provided with a stop 32 adapted to be interposed in the path of movement of the throttle valve 17 and to thereby arrest movement thereof when the pneumatic 23 is collapsed through, for example, one half of its total collapsing movement. If therefore the pneumatic 30 is collapsed before the expression pneumatic 23 is exhausted, a smaller step of increase in playing intensities will be inaugurated. Conversely, the expression pneumatic 23 may be wholly collapsed, to inaugurate the step change of greatest extent, and thereafter the pneumatic 30 may be collapsed and atmosphere admitted to the expression pneumatic 23, whereupon the stop 32 will engage the throttle valve 17 and prevent the expression pneumatic 23 from assuming its full expanded position until atmosphere is again admitted to pneumatic 30, whereupon it will expand under the action of a spring 33 and permit stop 32 to disengage the needle valve.

The various ducts 26, 27, 28 and 31 may be controlled to place them in communication with atmosphere or a source of exhaust, in any practicable manner by any suitable automatic means, preferably controlled by vents in the tracker. For instance, the so-called "automatic actions" described in Patent No. 1,008,291 may be adapted for this purpose. These automatic actions and valves form in themselves no part of this invention and therefore need not be described or shown herein.

It is to be understood that this invention is not limited to the particular construction, organization and mode of operation shown in the drawings and described for illustration. On the contrary, the invention may be variously embodied and the particular construction may be variously modified within the scope of the subjoined claims. It is not indispensable that all the features of the invention be used conjointly since, in some instances, they may be used separately to advantage.

I claim as my invention:

1. An instrument of the character described comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means to operate said bellows gradually to produce continuously progressive changes in playing intensities; means to operate said bellows suddenly to produce sudden changes in playing intensities; and stop means to limit the operation of said bellows.

2. An instrument of the character described comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means to operate said bellows gradually at different speeds to produce continuously progressive changes in playing intensities at different speeds; and means to operate said bellows suddenly to produce sudden changes in playing intensities.

3. An instrument of the character described, comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means to operate said bellows gradually to produce continuously progressive changes in playing intensities; means to operate said bellows suddenly to different extents to produce sudden changes of different extents in playing intensities; and stop means to fix the extent of operation of said bellows.

4. An instrument of the character described comprising, in combination, playing pneumatics; a main source of power for operating said playing pneumatics; a valve interposed between the playing pneumatics and main source of power and a regulator operatvely connected thereto; pneumatic tension means for variably tensioning the regulator; an expression bellows controlling said pneumatic means; means to operate said bellows gradually at different speeds to produce continuously progressive changes in playing intensities at different speeds; and means to operate said bellows suddenly to different extents to produce sudden changes of different extents in playing intensities.

5. An instrument of the character described comprising, in combination, playing pneumatics; a main source of power for operating said playing pneumatics; a valve interposed between the playing pneumatics and main source of power and a regulator operatively connected thereto; pneumatic means tending to open said valve; a throttle valve to govern the exhaust of said pneumatic means to open said valve; a pneumatic to operate said throttle valve; means to operate said pneumatic gradually to produce continuously progressive changes in playing intensities or suddenly to produce sudden changes in playing intensities; and stop means to limit the operation of said bellows.

6. An instrument of the character described comprising, in combination, playing pneumatics; a main source of power for operating said playing pneumatics; a valve interposed between the playing pneumatics and main source of power and a regulator operatively connected thereto; pneumatic means tending to open said valve; a throttle valve to govern the exhaust of said pneumatic means to open said valve; a pneumatic to operate said throttle valve; means to operate said pneumatic gradually at different speeds to produce continuously progressive changes in playing intensities at different speeds; and means to operate said pneumatic suddenly to produce sudden changes in playing intensities.

7. An instrument of the character described comprising, in combination, playing pneumatics; a main source of power for operating said playing pneumatics; a valve interposed between the playing pneumatics and main source of power and a regulator operatively connected thereto; pneumatic means tending to open said valve; a throttle valve to govern the exhaust of said pneumatic means to open said valve; a pneumatic to operate said throttle valve; means to operate said pneumatic gradually to produce continuously progressive changes in playing intensities; and means to operate said pneumatic suddenly to different extents to produce sudden changes of different extents in playing intensities.

8. An instrument of the character described comprising, in combination, playing pneumatics; a main source of power for operating said playing pneumatics; a valve interposed between the playing pneumatics and main source of power and a regulator operatively connected thereto; pneumatic means tending to open said valve; a throttle valve to govern the exhaust of said pneumatic means to open said valve; a pneumatic to operate said throttle valve; means to operate said pneumatic gradually at different speeds to produce continuously progressive changes in playing intensities at different speeds; and means to operate said pneumatic suddenly to different extents to produce sudden changes of different extents in playing intensities.

9. An instrument of the character described comprising, in combination, playing pneumatics; a main source of power for operating said playing pneumatics; a valve interposed between the playing pneumatics and main source of power and a regulator operatively connected thereto; pneumatic means tending to open said valve; a throttle valve for governing the exhaust of said pneumatic means to open said valve; a pneumatic for operating said throttle valve; means to operate said pneumatic gradually or suddenly; and means to arrest the operation of said throttle valve.

10. An instrument of the character described comprising, in combination, playing pneumatics; a main source of power for operating said playing pneumatics; a valve interposed between the playing pneumatics and main source of power and a regulator operatively connected thereto; pneumatic means tending to open said valve; a throttle valve for governing the exhaust of said pneumatic means to open said valve; a pneumatic for operating said throttle valve; means to operate said pneumatic gradually or suddenly; and a stop bellows to limit the movement of said pneumatic.

11. An instrument of the character described comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means through which said bellows may be exhausted gradually to produce continuously progressive changes in playing intensities; means through which said bellows may be exhausted suddenly to produce sudden changes in playing intensities; and means means to limit the movement of said expression bellows.

12. An instrument of the character described comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means through which said bellows may be exhausted gradually at different speeds to produce continuously progressive changes in playing intensities at different speeds; and means through which said bellows may be exhausted suddenly to produce sudden changes in playing intensities.

13. An instrument of the charatcer described comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means through which said bellows may be exhausted gradually to produce continuously progressive changes in playing intensities; and means through which said bellows may be exhausted suddenly to different extents to produce sudden changes of different extents in playing intensities.

14. An instrument of the character described comprising, in combination, playing pneumatics; a main source of power for operating said playing pneumatics; a valve interposed between the playing pneumatics and main source of power and a regulator operatively connected thereto; pneumatic tension means for variably tensioning the regulator; an expression bellows controlling said pneumatic means; means through which said bellows may be exhausted gradually at different speeds to produce continuously progressive changes in playing intensities at different speeds; and means through which said bellows may be exhausted suddenly to different extents to produce sudden changes of different extents in playing intensities.

In testimony whereof, I have signed my name to this specification this thirty-first day of January, 1917.

CHARLES F. STODDARD.